US012717423B2

(12) United States Patent
Ou

(10) Patent No.: US 12,717,423 B2

(45) Date of Patent: Aug. 25, 2026

(54) INPUT METHOD EDITOR FOR REMOTE APPLICATIONS

(71) Applicant: Citrix Systems, Inc., Fort Lauderdale, FL (US)

(72) Inventor: Yuran Ou, Nanjing (CN)

(*) Notice: Subject to any disclaimer, the term of this patent is extended or adjusted under 35 U.S.C. 154(b) by 602 days.

(21) Appl. No.: 17/481,736

(22) Filed: Sep. 22, 2021

(65) Prior Publication Data

US 2023/0055406 A1 Feb. 23, 2023

Related U.S. Application Data

(63) Continuation of application No. PCT/CN2021/112934, filed on Aug. 17, 2021.

(51) Int. Cl.

*G06F 3/023* (2006.01)
*G06F 3/02* (2006.01)
*G06F 9/455* (2018.01)

(52) U.S. Cl.

CPC .......... *G06F 3/0236* (2013.01); *G06F 3/0219* (2013.01); *G06F 9/45558* (2013.01); *G06F 2009/45595* (2013.01)

(58) Field of Classification Search

CPC .. G06F 3/0236; G06F 3/0219; G06F 9/45558; G06F 2009/45595; G06F 3/023; G06F 3/0481; G06F 3/14; G06F 17/24; G06F 17/30; G06F 17/22; G06F 17/21

See application file for complete search history.

(56) References Cited

U.S. PATENT DOCUMENTS

| | | | | |
|---|---|---|---|---|
| 7,870,496 | B1 | 1/2011 | Sherwani | |
| 8,922,490 | B2 | 12/2014 | Davidson | |
| 9,300,720 | B1 | 3/2016 | Qiu | |
| 9,553,953 | B2 | 1/2017 | Sullad et al. | |
| 9,578,113 | B2 | 2/2017 | Sullad | |
| 9,792,134 | B1 * | 10/2017 | Whaley | G06F 9/44505 |
| 10,057,206 | B2 | 8/2018 | Naidu | |
| 10,200,337 | B2 | 2/2019 | Naidu | |
| 12,067,174 | B2 | 8/2024 | Yiming et al. | |

(Continued)

FOREIGN PATENT DOCUMENTS

| | | | |
|---|---|---|---|
| CN | 102834819 | A | 12/2012 |
| CN | 107179952 | B | 3/2021 |

(Continued)

OTHER PUBLICATIONS

Office Action dated Mar. 4, 2022 for U.S. Appl. No. 17/481,746 (pp. 1-24).

(Continued)

*Primary Examiner* — Michael A Faragalla

(57) ABSTRACT

According to some embodiments, a method can include: detecting, by a first computing device, activation of a text input of an application executing on the first computing device; and responsive to the detection of the activation of the text input, sending one or more attributes of the text input from the first computing device to a second computing device displaying the application, the second computing device configured to present a composition window having the one or more attributes in common with the text input of the application, the composition window being part of an input method editor (IME) executing on the second computing device.

14 Claims, 15 Drawing Sheets

(56) References Cited

U.S. PATENT DOCUMENTS

| | | | |
|---|---|---|---|
| 2008/0115046 | A1 | 5/2008 | Yamaguchi |
| 2009/0237728 | A1 | 9/2009 | Yamamoto |
| 2010/0309137 | A1 | 12/2010 | Lee |
| 2011/0307772 | A1 | 12/2011 | Lloyd |
| 2012/0011280 | A1 | 1/2012 | Gilboa |
| 2012/0210261 | A1 | 8/2012 | Sarnoff |
| 2012/0306747 | A1 | 12/2012 | Davidson |
| 2014/0013234 | A1 | 1/2014 | Beveridge |
| 2014/0111434 | A1 | 4/2014 | Yang |
| 2014/0359003 | A1* | 12/2014 | Sullad ..................... H04L 63/08 709/203 |
| 2015/0106702 | A1* | 4/2015 | Scott ..................... G06F 40/166 715/265 |
| 2015/0121291 | A1 | 4/2015 | Scott et al. |
| 2016/0323217 | A1 | 11/2016 | Subramani et al. |
| 2017/0220688 | A1 | 8/2017 | Zeung |
| 2017/0302610 | A1 | 10/2017 | Naidu |
| 2018/0331995 | A1 | 11/2018 | Naidu |
| 2019/0124037 | A1 | 4/2019 | Naidu |
| 2019/0332255 | A1 | 10/2019 | Wang |

FOREIGN PATENT DOCUMENTS

| | | | |
|---|---|---|---|
| CN | 112491974 | A | 3/2021 |
| JP | 2015148852 | | 8/2015 |
| JP | 2015158719 | A | 9/2015 |
| KR | 20040089600 | A | 10/2004 |
| WO | 2015130027 | A1 | 9/2015 |

OTHER PUBLICATIONS

International Search Report and Written Opinion issued in App. No. PCT/CN2021/112934, mailing date Apr. 25, 2022, 8 pages.

Input Method Editor API, W3C Working Group Note, http://www.w3.org/TR/2016/NOTE-ime-api-20160524/, May 24, 2016, 23 pages.

Office Action dated Jun. 24, 2022 for U.S. Appl. No. 17/481,746 (pp. 1-28).

MDN Web Docs, “Input method editor”, Jun. 8, 2023, https://developer.mozilla.org/en-US/docs/Glossary/Input_method_editor (Year: 2023).

* cited by examiner

910

Password: * * * * *

INPUT METHOD EDITOR FOR REMOTE APPLICATIONS

CROSS REFERENCE TO RELATED APPLICATION

This application is a continuation of and claims the benefit of PCT Patent Application No. PCT/CN2021/112934 filed on Aug. 17, 2021 in the English language in the State Intellectual Property Office and designating the United States, the contents of which are hereby incorporated herein by reference in its entirety.

BACKGROUND

An input method editor (IME) is an operating system component or program that enables users to generate characters not natively available on their input devices (e.g., physical or virtual keyboard) by using sequences of characters that are natively available on their input devices. Using an IME may be necessary for languages that have more graphemes than there are keys on the keyboard, such as Chinese, Japanese, and Korean languages.

A server running on a network of an enterprise may provide services to remote clients. The services may include applications running locally on the server and accessed by the remote clients over the network. Such applications may be virtualized, meaning that they run within a virtual computing environment provided by the server. Clients may access applications running remotely on a server via a remote display protocol, such as the Independent Computing Architecture (ICA) or the Remote Desktop Protocol (RDP). Different types of clients for accessing remote applications exist, including native applications and browser-based clients such as HTML5 clients.

SUMMARY

Described herein are embodiments and systems and methods for providing an improved IME for remotely accessed applications, including but not limited to virtualized applications. Disclosed embodiments provide an IME user experience for remote, web-based applications that is essentially identical to that of local, native applications. Disclosed embodiments solve several technical problems exhibited by some client-server IME solutions including inconsistent visual presentation between the client and server, and unwanted enabling of IME for inputs that accept sensitive information, such as password inputs.

According to one aspect of the disclosure, a method can include: detecting, by a first computing device, activation of a text input of an application executing on the first computing device; and responsive to the detection of the activation of the text input, sending one or more attributes of the text input from the first computing device to a second computing device displaying the application, the second computing device configured to present a composition window having the one or more attributes in common with the text input of the application, the composition window being part of an input method editor (IME) executing on the second computing device.

In some embodiments, the method may further include: receiving, by the first computing device, composed text generated by the IME executing on the second computing device, the composed text based at least in part on keystrokes received by the composition window; and inserting, by the first computing device, the composed text into the text input of the application. In some embodiments, the one or more attributes of the text input may include dimensions and a position of the text input. In some embodiments, the one or more attributes of the text input may include a font family and a font size of the text input. In some embodiments, the one or more attributes of the text input can include information describing text entered within the text input, and the second computing device may be configured to adjust the composition window based on a length of the text entered within the text input.

In some embodiments, the one or more attributes of the text input can include a type of the text input, and the second computing device may be configured to configured to selectively enable the IME based on the type of the text input. In some embodiments, sending the one or more attributes of the text input from the first computing device to the second computing device can include sending the one or more attributes of the text input via a remote display protocol. In some embodiments, the method can further include: detecting, by the first computing device, a change to at least one of the one or more attributes of the text input; and responsive to the detection of the change, sending the at least one changed attribute to the second computing device, the second computing device configured to adjust the composition window to have the at least one changed attribute in common with the text input of the application.

In some embodiments, the application is a web application and the text input may be an HTML element of the web application. In some embodiments, the detection of the activation of the text input can include detecting a focus of the text input. In some embodiments, the application may be executing within a virtual machine (VM) on the first computing device.

According to another aspect of the disclosure, a method can include: receiving, by a first computing device, one or more attributes of a text input of an application executing on a second computing device, the first computing device displaying the application; and configuring, by the first computing device, a composition window to have the one or more attributes in common with the text input of the application, the composition window being part of an input method editor (IME) executing on the first computing device.

In some embodiments, the method can further include: receiving, by the first computing device, composed text generated by the IME based at least in part on keystrokes received by the composition window; and sending, by the first computing device, the composed text to the second computing device, the second computing device configured to insert the composed text into the text input of the application. In some embodiments, the one or more attributes of the text input may include dimensions and a position of the text input. In some embodiments, the one or more attributes of the text input can include a font family and a font size of the text input.

In some embodiments, the one or more attributes of the text input may include information describing text entered within the text input, and configuring of the composition window can include adjusting the composition window based on a length of the text entered within the text input. In some embodiments, the one or more attributes of the text input can include a type of the text input, and the method may further include selectively enabling the IME based on the type of the text input. In some embodiments, receiving the one or more attributes of the text input can include receiving the one or more attributes of the text input from the second computing device via a remote display protocol. In some embodiments, the application may be executing within a virtual machine (VM) on the second computing device.

According to another aspect of the disclosure, a computing device may include: a processor and a non-volatile memory storing computer program code that when executed on the processor causes the processor to execute a process. The process can include: detecting activation of a text input of an application executing on the computing device; and responsive to the detection of the activation of the text input, sending one or more attributes of the text input from the computing device to another computing device displaying the application, the another computing device configured to present a composition window having the one or more attributes in common with the text input of the application, the composition window being part of an input method editor (IME) executing on the another computing device.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
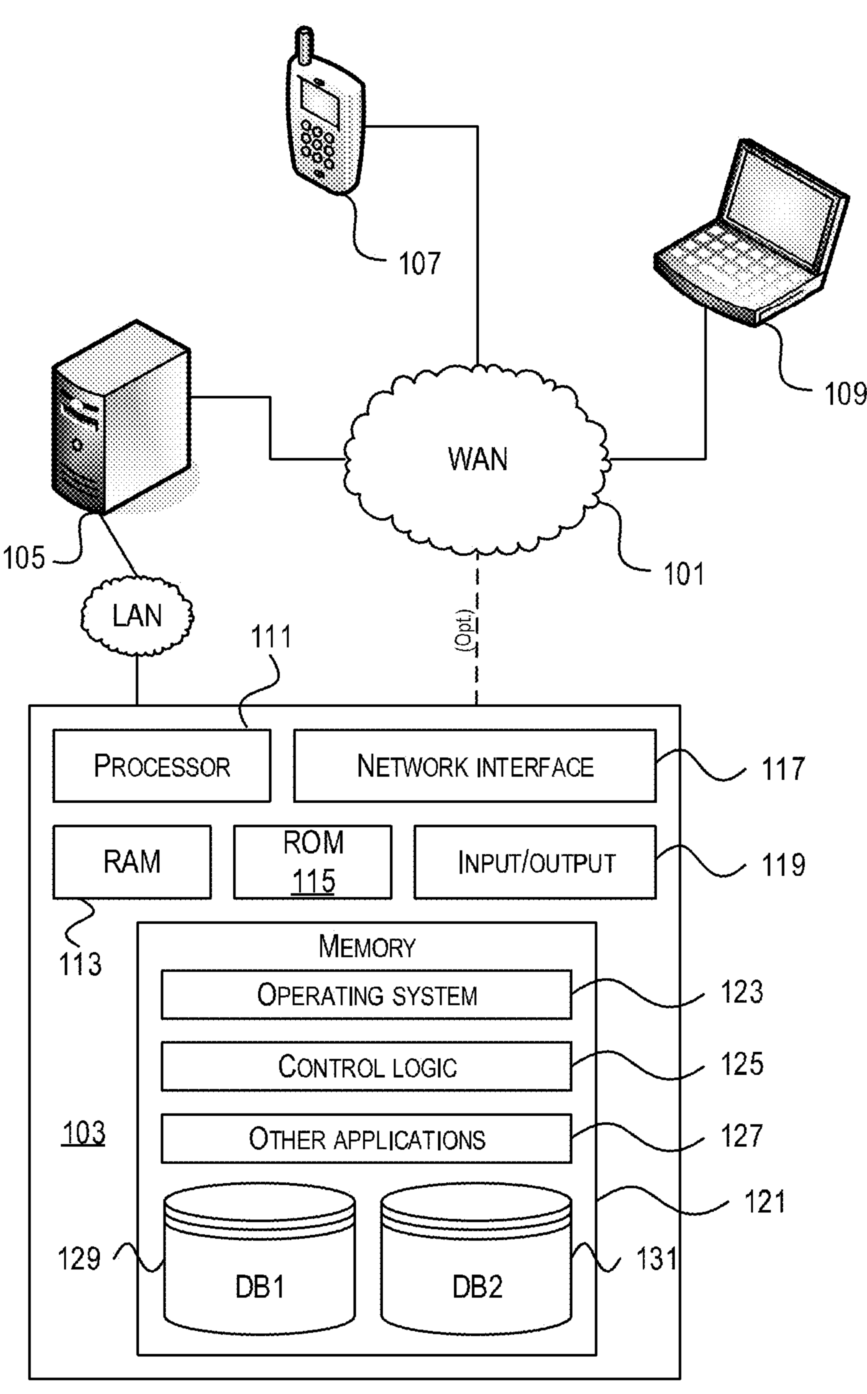
FIG. 1 depicts an illustrative computer system architecture that may be used in accordance with one or more illustrative aspects of the concepts described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
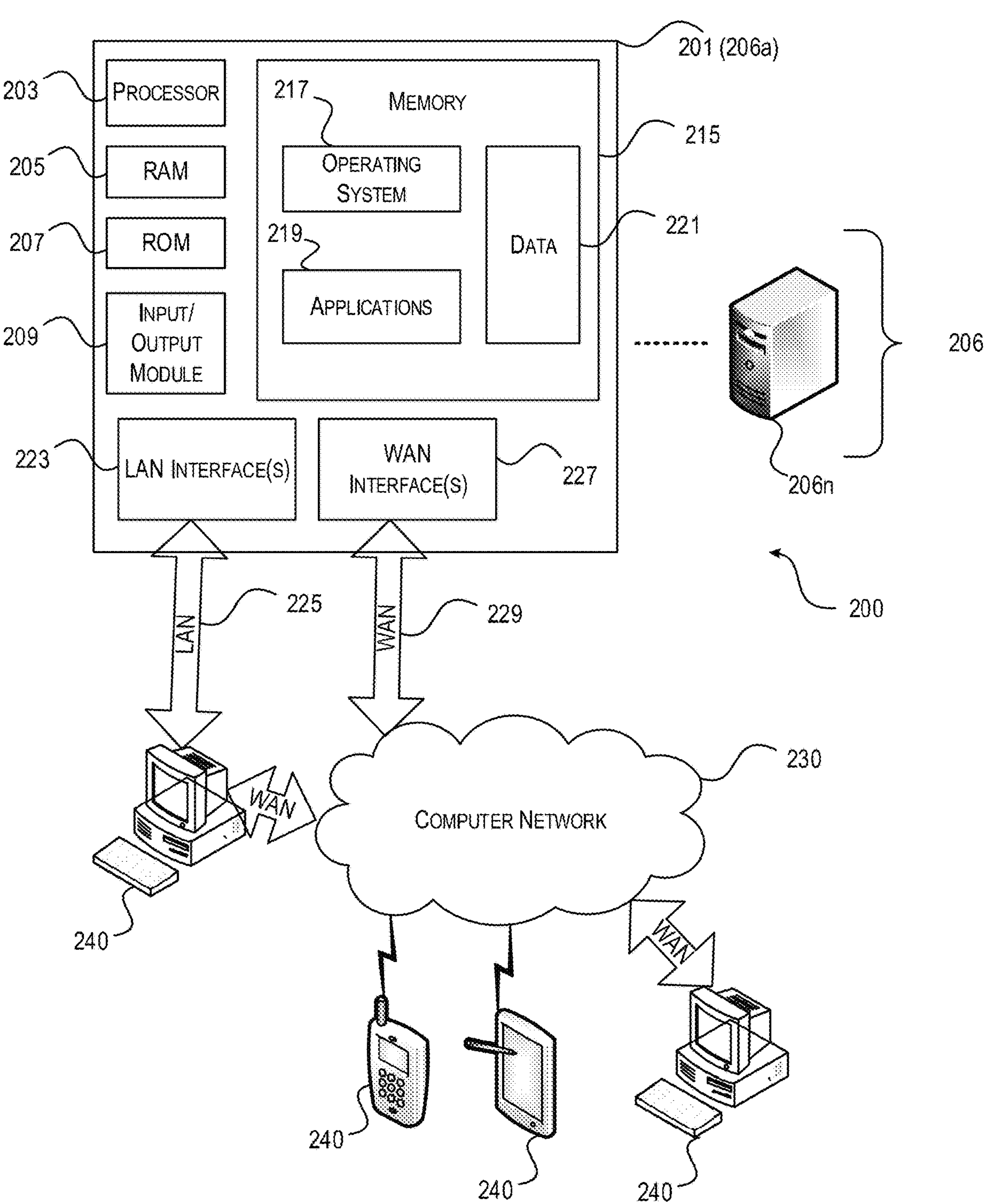
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server **206*a* in a single-server or multi-server desktop virtualization system (e.g., a remote access or cloud system) configured to provide VMs for client access devices. The computing device 201 may have a processor 203 for controlling overall operation of the server and its associated components, including RAM 205, ROM 207, input/output (I/O) module 209, and memory 215**.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all the elements described above with respect to the data server 103 or computing device 201. The network connections depicted in FIG. 2 include a local area network (LAN) 225 and a wide area network (WAN) 229 but may also include other networks. When used in a LAN networking environment, computing device 201 may be connected to the LAN 225 through an adapter or network interface 223. When used in a WAN networking environment, computing device 201 may include a modem or other wide area network interface 227 for establishing communications over the WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206*a*-206*n* (generally referred to herein as "server(s) 206"). In one embodiment, the computing environment 200 may include a network appliance installed between the server(s) 206 and terminals 240. The network appliance may manage client/server connections, and in some cases can load balance client connections amongst a plurality of back-end servers 206.

The terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

A terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). The server 206, in some embodiments, may be referred to as any one of the following non-exhaustive terms: server(s), local machine; remote machine; server farm(s), or host computing device(s).

In one embodiment, the terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on a server 206 or a hypervisor executing on a terminal 240.

Some embodiments include a terminal 240 that displays application output generated by an application remotely executing on a server 206 or other remotely located machine. In these embodiments, the terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Fort Lauderdale, Florida; or the Remote Desktop Protocol (RDP) manufactured by Microsoft Corporation of Redmond, Washington.

A remote computing environment may include more than one server 206*a*-206*n* logically grouped together into a server farm 206, for example, in a cloud computing environment. The server farm 206 may include servers 206*a*-206*n* that are geographically dispersed while logically grouped together, or servers 206*a*-206*n* that are located proximate to each other while logically grouped together. Geographically dispersed servers 206*a*-206*n* within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206*a* that receives requests from a terminal 240, forwards the request to a second server 206*b* (not shown), and responds to the request generated by the terminal 240 with a response from the second server 206*b* (not shown). First server 206*a* may acquire an enumeration of applications available to the terminal 240 as well as address information associated with an application server 206 hosting an application identified within the enumeration of applications. First server 206*a* can present a response to the client's request using a web interface and communicate directly with the terminal 240 to provide the terminal 240 with access to an identified application. One or more terminals 240 and/or one or more servers 206 may transmit data over network 230, e.g., network 101.

Figure 3:
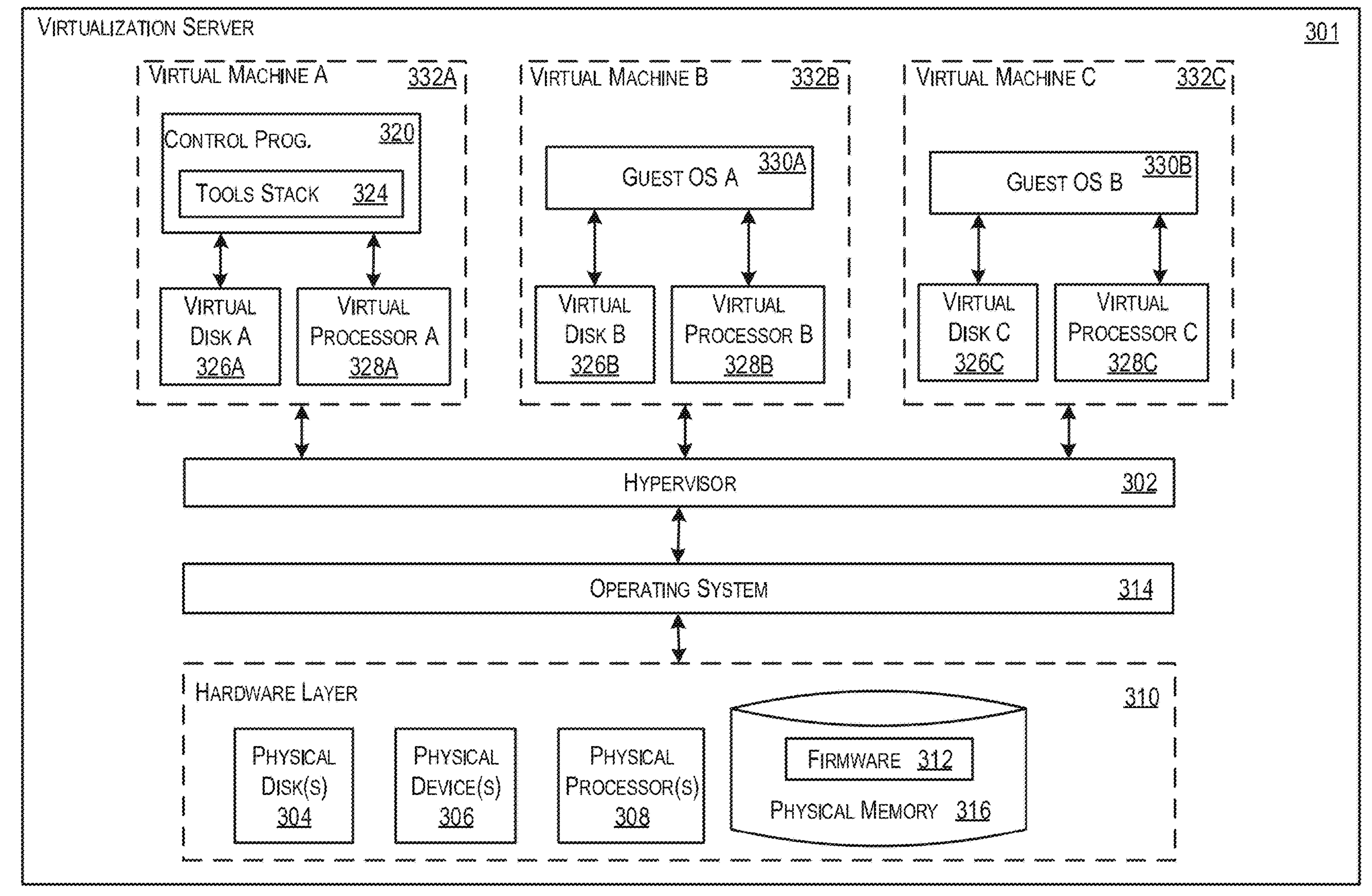
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, DomO, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine. Hypervisor 302 may be Type 2 hypervisor, where the hypervisor executes within an operating system 314 executing on the virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301 and may include program data stored in the physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute a hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Florida.

Hypervisor 302 may create one or more VMs 332B-C (generally 332) in which guest operating systems 330 execute. In some embodiments, hypervisor 302 may load a VM image to create a VM 332. In other embodiments, the hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by the virtualization server 301 (e.g., any hardware resource available within the hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to the VM 332.

As shown in FIG. 3, virtualization server 301 may host or execute one or more VMs 332. A VM 332 is a set of executable instructions that, when executed by a processor 308, may imitate the operation of a physical computer such that the VM 332 can execute programs and processes much like a physical computing device. While FIG. 3 illustrates an embodiment where a virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to the VMs 332.

Each VM 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each VM 332 with a unique view of the physical disks 304. Thus, in these embodiments, the particular virtual disk 326 included in each VM 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
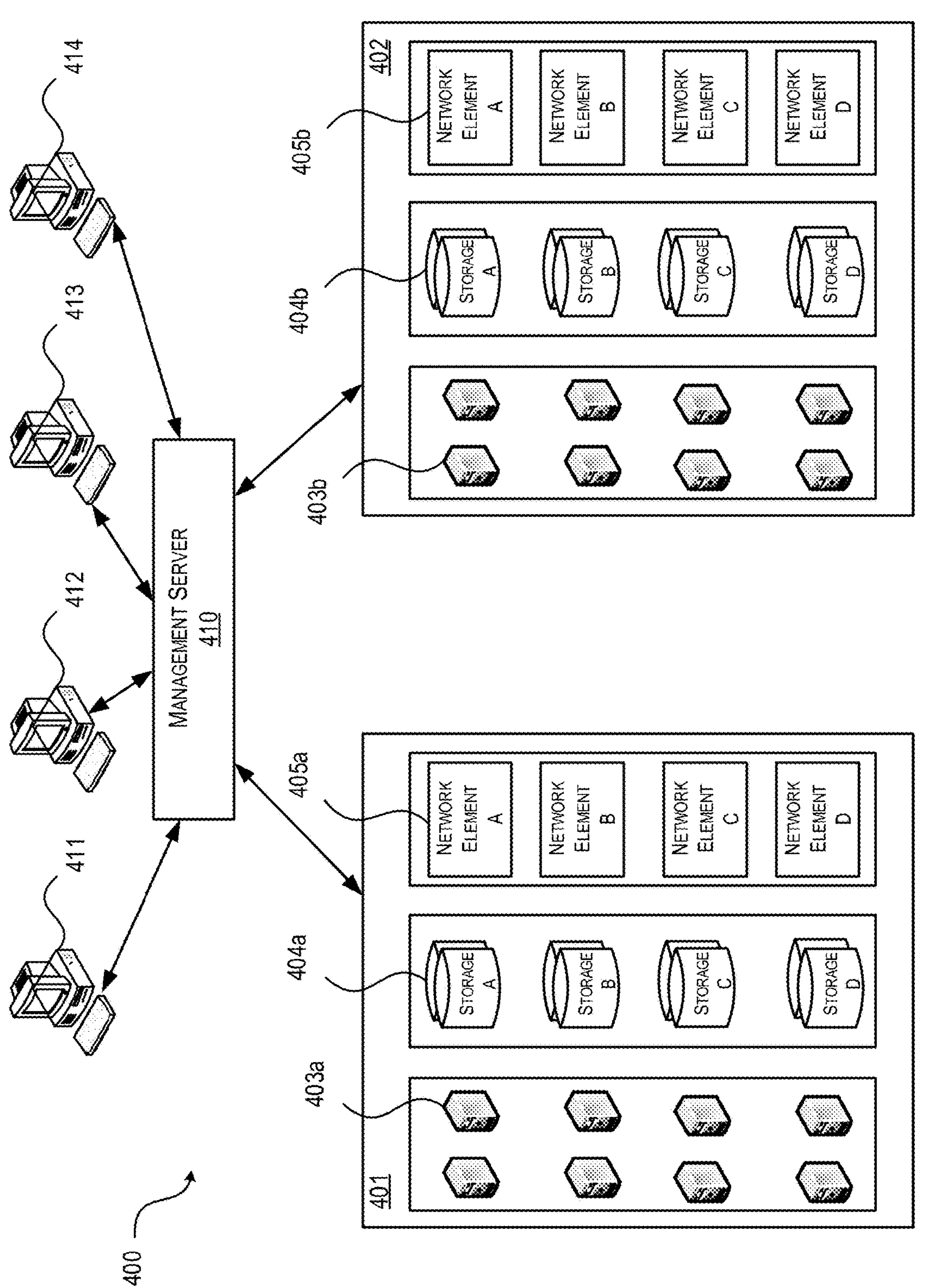
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403*a*-403*b* (generally referred to herein as "host servers 403"), storage resources 404*a*-404*b* (generally referred to herein as "storage resources 404"), and network resources 405*a*-405*b* (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, MA, among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. The management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in a cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Washington), AMAZON EC2 (Amazon.com Inc. of Seattle, Washington), IBM BLUE CLOUD (IBM Corporation of Armonk, New York), or others.

Figure 5:
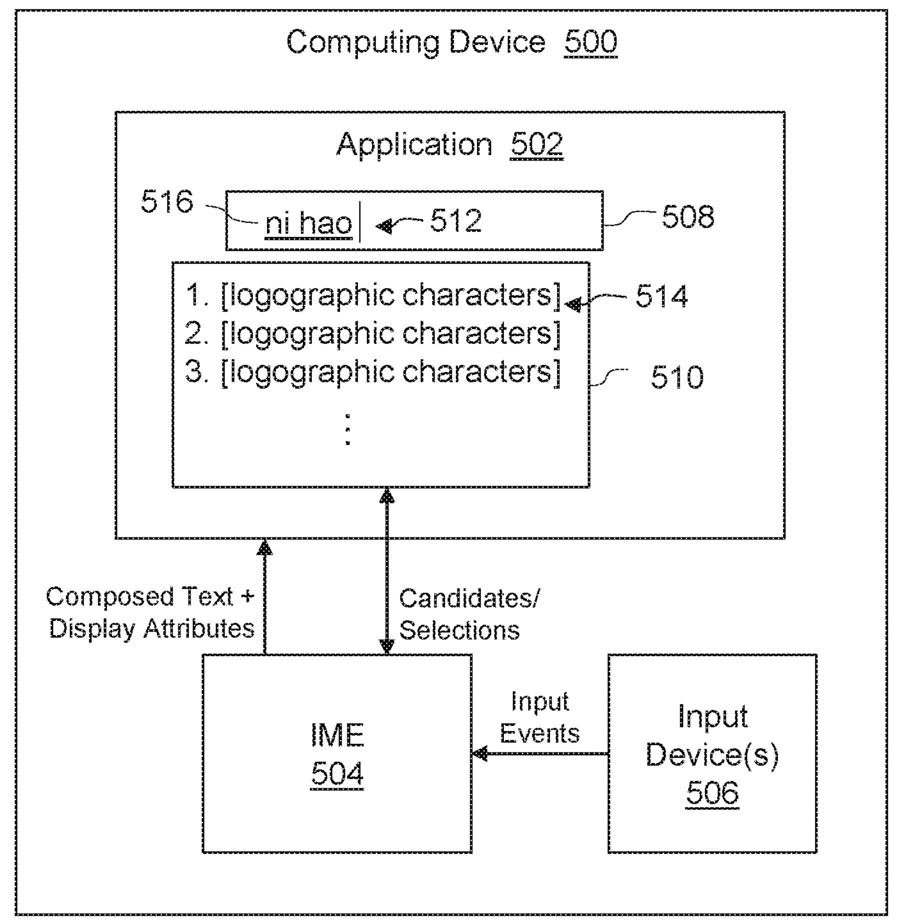
FIG. 5 is a diagram of a conventional input method editor (IME) component used on a computing device.

FIG. 5 illustrates a conventional input method editor (IME) used on a computing device 500. Illustrative computing device 500 can include one more applications (e.g., application 502), one or more IMEs 504, and one or more input devices 506. A given IME 504 can be provided as a operating system (OS) component or as a standalone program, e.g., an application installed on computing device 500 separate from the OS. A user may choose to install one or more IMEs on their computing device 500 that differ in terms of appearance and/or functionality. Applications 502 and IMEs 504 may be embodied as computer-executable instructions stored on a computer readable storage medium (not shown) and executable by one or more processors (not shown) of computing device 500. To promote clarity in the drawings, only one application 502 and one IME 504 are shown in FIG. 5. Moreover, various hardware and/or software components that may be found in a conventional computing device are omitted from FIG. 5 for clarity.

IME 504 can include, or otherwise be associated with, a composition window 508 and a candidates window 510. The composition window 508 and candidates window 510 form the user interface (UI) for the IME. A conventional IME can include additional UI elements not shown in the simplified example of FIG. 5, such as a status window by which a user can set a conversion mode for IME 504 (e.g., which language and/or alphabet is being used by IME 504). In response to keystrokes and/or other inputs produced by a user, IME 504 generates composed text which is displayed within a composing string 512 of composition window 508. Keystrokes can be received from a physical keyboard, a virtual keyboard, or other type of input device 506. Depending on the conversion mode, the composed text generated by IME 504 can include the keystrokes as directly entered by the user, or may include converted text that is generated and/or chosen based on such keystrokes. Composition window 508 can receive the composed text and update composing string 512 accordingly. Composing string 512 corresponds to the current text (e.g., word or phrase) being entered in the composition window 508.

Candidates window 510 appears in conjunction with the composition window 508 and includes a list of alternative text, or candidates 514, selected or generated by the IME 504 based on character within composing string 512. Each of the candidates 514 can include a single character or multiple characters, as shown in FIG. 5. The user can scroll through the candidates 514 and select the desired characters using a mouse, touchscreen, or other input device 506. In some implementations, the candidates 514 are labeled (e.g., "1," "2," etc.) and the user can press a corresponding key to select a candidate. In response, IME 504 can send the selected character(s) to composition window 508 for displayed. Candidates window 510 may be positioned below, above, or otherwise near to composing string 512 such that a user can easily view and select candidates 514 while composing text.

As shown in FIG. 5, composition window 508 and candidates window 510 may be implemented as part of an application 502. In more detail, IME 504 may provide an application programming interface (API) that application 502 can use to interface with IME 504. Examples of IME APIs include Input Method Manager (IMM) on WINDOWS and Input Method Editor API, a standard API for web browsers. Using an IME API, application 502 can use an IME functions and messages to create and manage their own IME windows, providing a custom interface while using the conversion capabilities of the IME. In other examples, composition window 508 and/or candidates window 510 may be implemented by IME 504.

IME 504 may track the status of the composing string 512 over time. This status can include attribute information, clause information, typing information, and text cursor position (also known as the caret position). IME 504 can alter one or display attributes of composing string 512 based on the conversion mode, the status of the composing string, and/or other factors. For example, as shown in FIG. 5, IME 504 can instruct application 502 (e.g., by sending a message via an IME API) to apply a particular style of underlining 516 to composing string 512. The underlining 516 may indicate to the user, for example, which language/alphabet is being used for the IME composition and different styles of underlines may be used to distinguish between different languages/alphabets. The usability of IME 504 may depend on such display attributes be rendered properly in relation to composing string 512. For example, if underlining 516 is not rendered directly below composing string 512, a user of computing device 500 may lack the context to enter characters accurately and efficiently.

Figure 6:
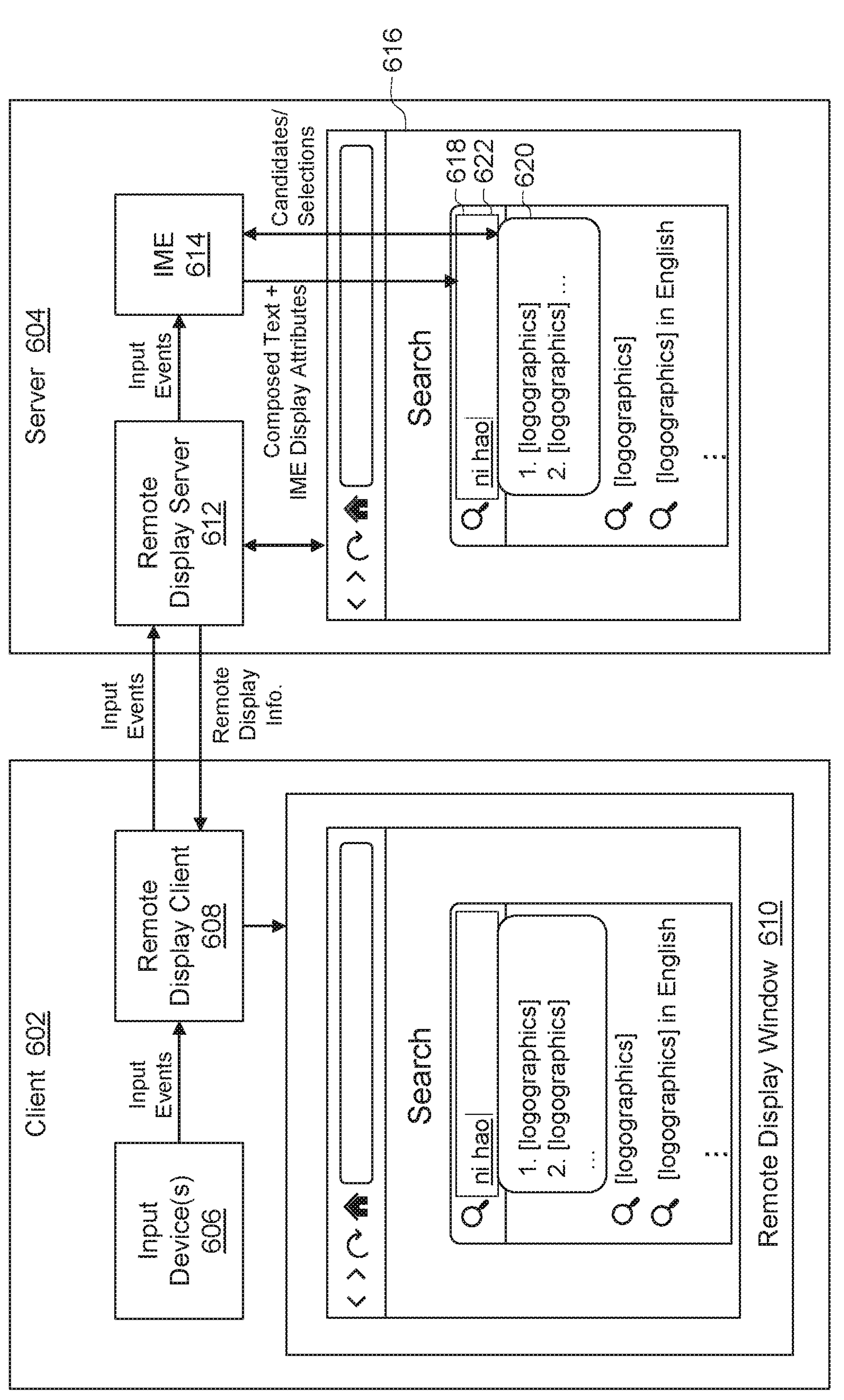
FIG. 6 is a diagram of a server-side IME implementation.
Figure 7:
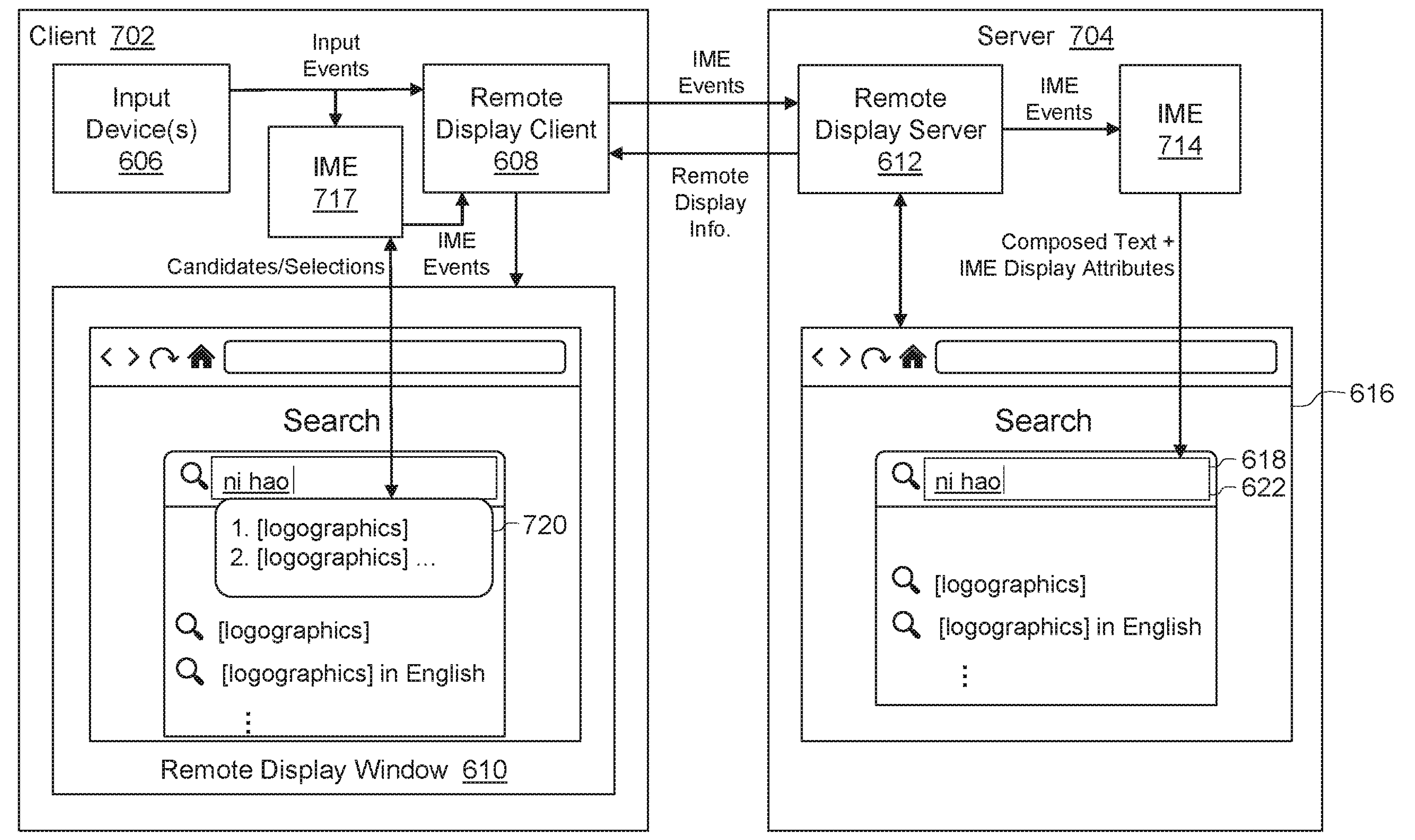
FIG. 7 is a diagram of a client-side IME implementation with server-side composing.
Figure 8:
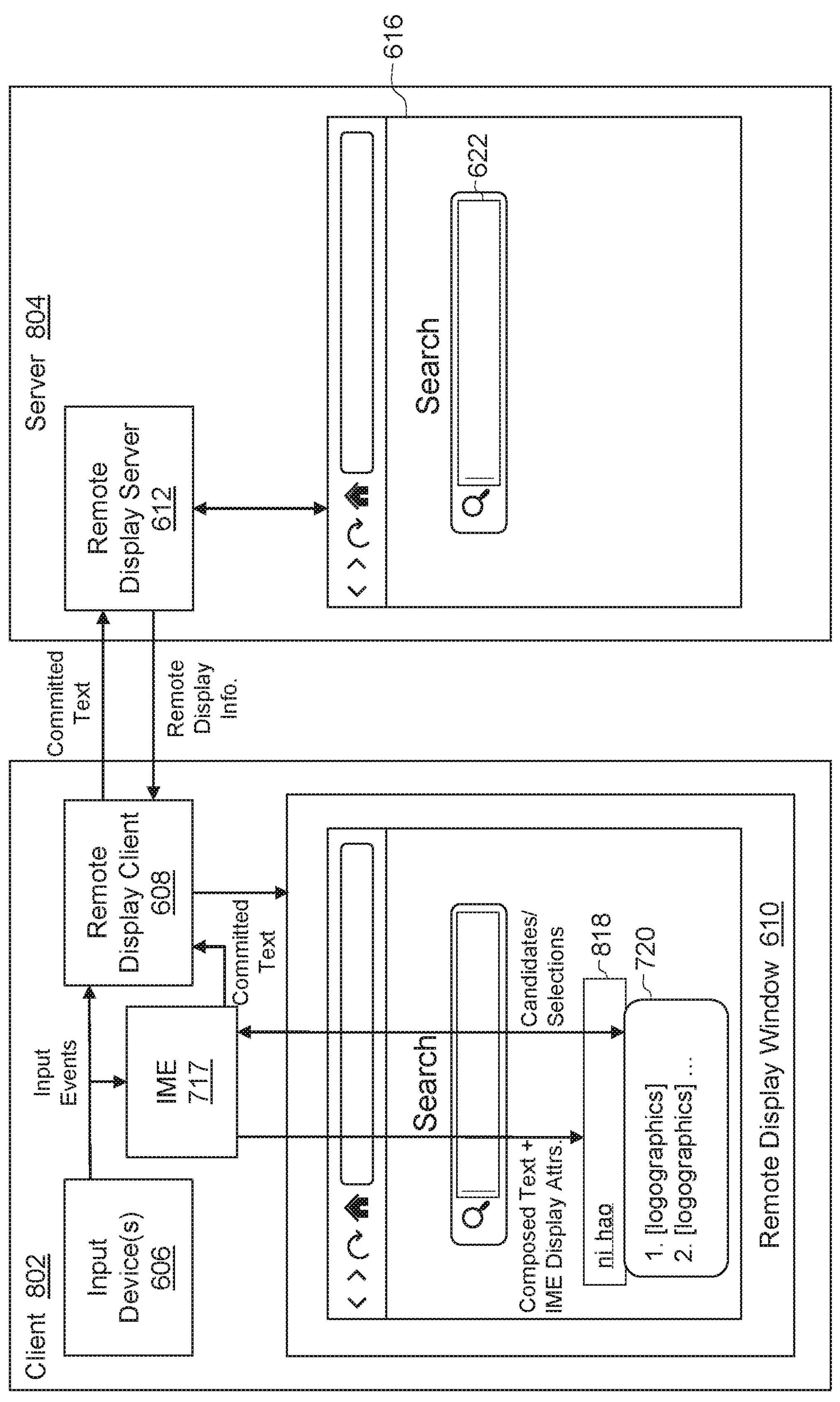
FIG. 8 is a diagram of a client-side IME implementation with client-side composing.

The conventional IME approach described above in the context of FIG. 5 is designed for applications running locally on a computing device. FIGS. 6-8 illustrate three IME implementations for remote applications (e.g., applications running on server and accessed by a remote client). In FIGS. 6-8, like elements are identified using like reference numerals.

FIG. 6 shows an server-side IME implementation for remote applications. An illustrative computing environment 600 includes a client 602 and a server 604 which may be connected via one or more computer networks (not shown) such as the Internet or another wide area network (WAN). As such, client 602 and server 604 may be considered as being remote from each other. In the example shown, client 602 accesses an application 616 running on server 604 using a remote display protocol such as ICA or RDP. The remote display protocol can include a set of data transfer rules that allow for applications and desktops hosted on server 604 to be displayed on remote client 602 and to receive keystrokes, mouse clicks, touch events, and inputs from users of remote client 602. In some cases, server 604 can be a virtualization server configured to provide virtual desktops and/or virtual applications to one or more clients.

Illustrative client 602 includes one or more input devices 606, a remote display client 608, and a remote display window 610, among other hardware and/or software components not shown to promote clarity in the drawing. Input devices 606 can include a physical or virtual input devices (e.g., keyboards, mice, touchscreens, etc.) that generate input events in response to user inputs. Such input events can include keystrokes, mouse clicks, touch events, etc. Client 602 can include device drivers to handle input from corresponding ones of the input devices 606. Remote display client 608 receives input events from input devices 606 and sends them to server 604. In addition, remote display client 608 receives remote display information from server 604 and, using this remote display information, causes the remote application 616 to be displayed within remote display window 610 on client 602. In general, a server 604 can provide one or more clients access to one or more remote applications. Remote display client 608 may be implemented within a native application or as a browser-based client such as an HTMLS client. In the latter case, remote display window 610 may correspond to browser window.

Illustrative server 604 includes a remote display server 612, an IME 614, and application 616, among other hardware and/or software components not shown to promote clarity in the drawing. Remote display server 612 receives input events from client 602 and provides the input events to IME 614 and/or directly to application 616 running on server 604. In addition, remote display server 612 sends remote display information to client 602 to enable client 602 to display application 616 with remote display window 610. While illustrative application 616 is shown as a web browser (e.g., a remote/virtualized browser), the various IME implementations described herein may, in general, be used to access any type of remote applications.

Server-side IME 614 of FIG. 6 may function similar to a conventional IME, such as IME 504 of FIG. 5. For example, IME 614 can (1) generate, in response to keystrokes, composed text for display within a composition window 618 of application 616, (2) present a list of alternative text within a candidates window 620 of application 616; and (3) alter one or display attributes of a composing string within composition window 618 based on a conversion mode, the status of the composing string, and/or other factors. The composition window 618 and/or candidates window 620 may be implemented by application 616 or by IME 614. As shown, composition window 618 may correspond to an active text input 622 of application 616. As used herein, the term "text input" refers to any type of UI element/control that can receive keystrokes entered by a user. The term "active text input" herein refers to a text input of an application that currently has focus or is otherwise configured to receive keystrokes for the application at the current time. A particular text input of an application may become the active text input when it gains focus and may cease to be the active text input when it loses focus (i.e., an application's active text input can change over time). One difference between the server-side IME implementation of FIG. 6 and the conventional IME 504 of FIG. 5 is that, in FIG. 6, input events received by IME 614 are generated and sent by a remote computing device (e.g., client 602) whereas, in FIG. 5, input events received by IME 504 are generated by the local computing device (e.g., by computing device 500).

It is appreciated herein that one disadvantage of the server-side IME implementation of FIG. 6 is that a user of client 602 may not have control over which IME 614 is used/enabled on server 604 in conjunction with a particular remote application 616 or desktop. For example, a user may not be able use their preferred IME but instead may be required to use a default IME installed on server 604.

FIG. 7 illustrates an client-side IME implementation with server-side composing. An illustrative computing environment 700 includes a client 702 and a server 704 which may be connected via one or more computer networks (not shown) such as the Internet or another wide area network (WAN). Illustrative client 702 includes an IME 717 in addition to input devices 606, remote display client 608, remote display window 610, and other hardware and/or software components not shown. Illustrative server 704 includes an IME 714 in addition to remote display server 612, application 616, and other hardware and/or software components not shown. As with FIG. 6, here client 702 is accessing application 616 running on server 704, and application 616 is displayed with the client's remote display window 610 via a remote display protocol.

In the implementation of FIG. 7, client-side IME 717 handles certain input events (e.g., keystrokes) and, responsive thereto, generates IME events which are sent to server 704. As shown in FIG. 7, remote display client 608 can receive (or "capture") the IME events and send them to server 704 via the remote display protocol. Remote display client 608 can also send certain input events (e.g., mouse events, touch events, and other non-keystroke events) to server 704 and receive remote display information from the server, as previously discussed. An IME event can include, for example, composed text and associated IME display attributes. Server 704 uses the IME events to render the composed text and IME display attributes within the composition window 618. Concurrent therewith, client-side IME 717 presents a candidates window 720 within, or on top of, remote display window 610 such that a user can select alternative text for the IME composition. In response to the user selecting alternative text within candidates window 720, client-side IME 717 can generate an IME event to send the alternative text to server-side IME 714, which in turn updates the composition window 618 accordingly. Of note, within the illustrative remote display window 610 of FIG. 7, only candidates window 720 is rendered locally on client 702 while the remaining visual elements are rendered on server 704 and then displayed on client 702 using the display information received from remote display server 612.

In the case where the client 702 and server 704 run different OS's (e.g., WINDOWS versus LINUX), there may be visual inconsistencies between the client-side candidates window 720 and the server-side composition window 618 (e.g., in terms of font rendering). Moreover, in the case where remote display client 608 and remote display window 610 are provided as a browser-based client (e.g., an HTML5 client), it may not be possible to capture certain IME event data such as the IME display attributes due to limitations imposed by the web browser. Thus, in some cases, the IME implementation of FIG. 7 may fail to provide a native IME user experience when accessing remote application 616.

FIG. 8 is a diagram of an client-side IME implementation with client-side composing. An illustrative computing environment 800 includes a client 802 and a server 804 which may be connected via one or more computer networks (not shown) such as the Internet or another wide area network (WAN). Illustrative client 802 includes IME 717, input devices 606, remote display client 608, remote display window 610, and other hardware and/or software components not shown. Illustrative server 804 includes remote display server 612, application 616, and other hardware and/or software components not shown. Notably, with the implementation of FIG. 8, it is not necessary for server to include or utilize an IME. As with FIG. 6, here client 702 is accessing application 616 running on server 704 and the application on client 702 displayed within remote display window 610.

In the implementation of FIG. 8, client-side IME 717 renders both a composition window 818 and the candidates window 720. The user can use these locally rendered IME windows to compose text. When the user is finished composing text (e.g., a word or phrase) within the current composing string, the composed text can be finalized or "committed" by IME 717 and sent to server 804 by remote display client 608 using a remote display protocol. A user may indicate they are finished composing text by, for example, selecting the one of the candidates from the candidate window using a key press, touch, or mouse click. On the server 804, remote display server 612 receives the composed text and provides it to application 616 where it is inserted into the active text input 622 of application 616 (e.g., into a currently focused text input of a web page).

While the implementation of FIG. 8 can provide a fully native IME user experience, it may exhibit certain usability and other technical problems. For example, it may fail to set the dimensions and/or position of composition window 818 to match those of active text input 622. As illustrated in FIG. 8, this can result in the composition window 818 being positioned relatively far away from the active text input 622 as displayed within remote display window 610. As another example, the IME implementation of FIG. 8 may fail to set the font family, size, style, and/or other font attributes of composition window 818 to match those of active text input 622.

Figure 8A:
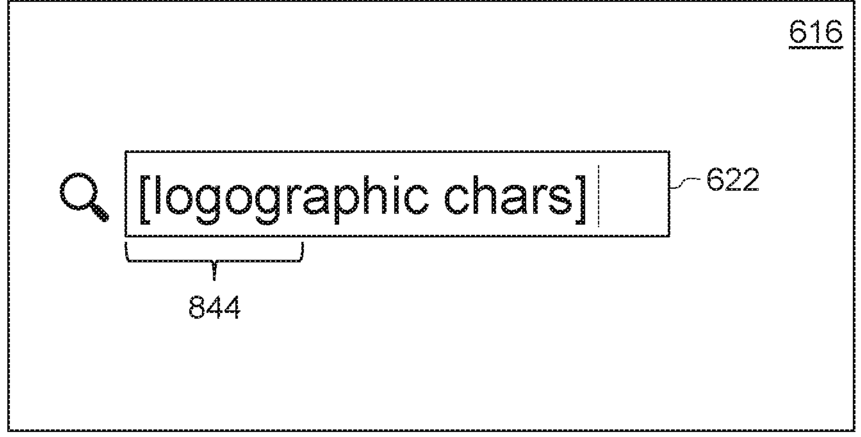
FIGS. 8A-8C are diagrams illustrating technical problems with the IME implementation of FIG. 8.
Figure 8A:
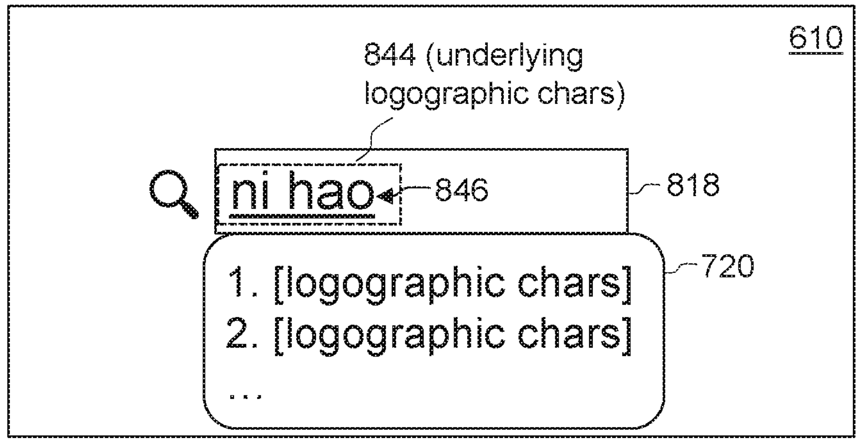

FIG. 8A illustrates another problem that can occur the IME implementation of FIG. 8. Here, server-side active text input 622 includes text 844 that was entered before the client-side IME is enabled. For example, text 844 may have been entered by the user during a previous IME session or may have been automatically inserted into text input 622 by the server (e.g., as a default value). Subsequently, when the IME is enabled, the user may enter text 846 into client-side composition window 618. As shown, the subsequently composed text 846 may be rendered on top of, and interfere with, the previously entered text 844 making it difficult to view the composed text 846 and/or the previously entered text 844 on the client.

Figure 8B:
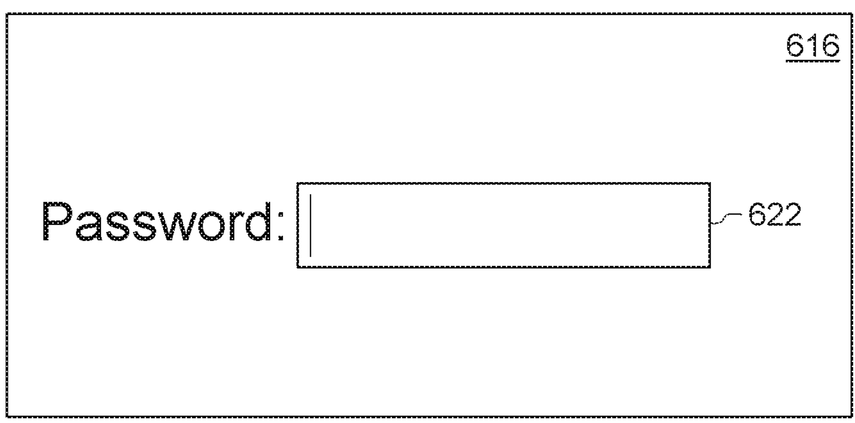
Figure 8B:
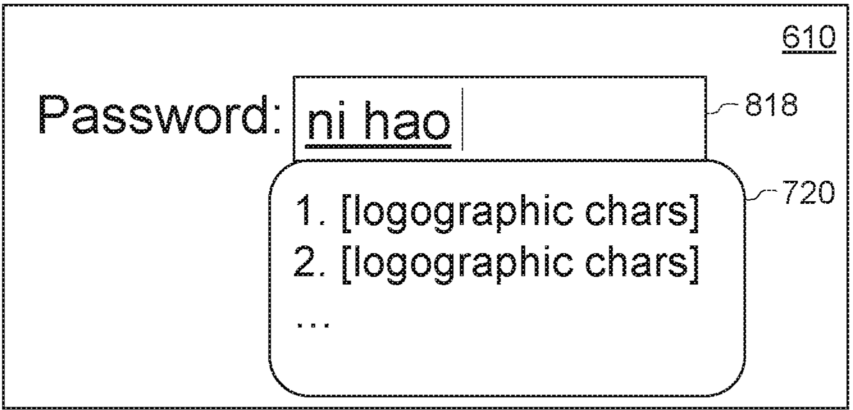
Figure 8C:
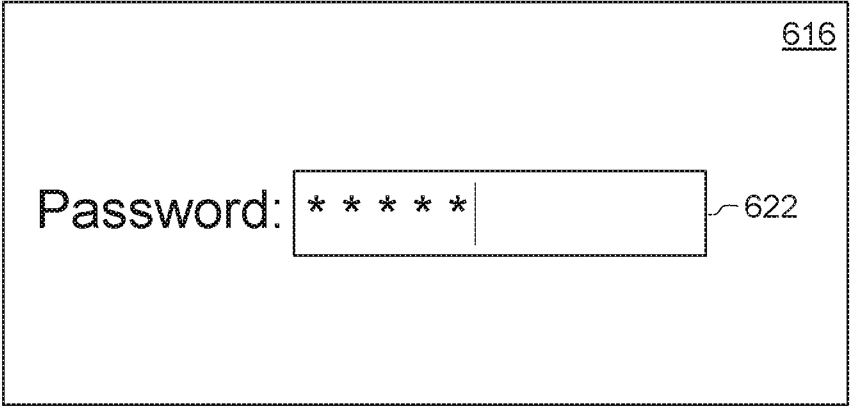

Turning to FIGS. 8B and 8C, another technical problem with the IME implementation of FIG. 8 is that the IME may inadvertently become enabled for sensitive text inputs, such as password inputs. Many applications restrict password characters to alphanumeric characters from the English language and, thus, use of an IME may be unnecessary and counterproductive when entering passwords within such applications. However, as shown in FIG. 8B, the client-side IME implementation of FIG. 8 may be unaware that the server-side active text input 622 is a password input and, as such, may present composition window 818 and candidates window 720 as the user enters their password. This can present a security risk as the password characters are visible within composition window 818 and candidates window 720. When the user finishes entering their password within composition window 818, the composed text may be sent to the remote application 616 where it is inserted into the active text input 622. As shown in FIG. 8C, the password input 622 is configured to hide the password from view by, for example, displaying an asterisk or other symbol in place of each password character. Thus, the IME implementation of FIG. 8 may inadvertently display the user's password in the clear, circumventing a security measure of remote application 616.

Figure 9:
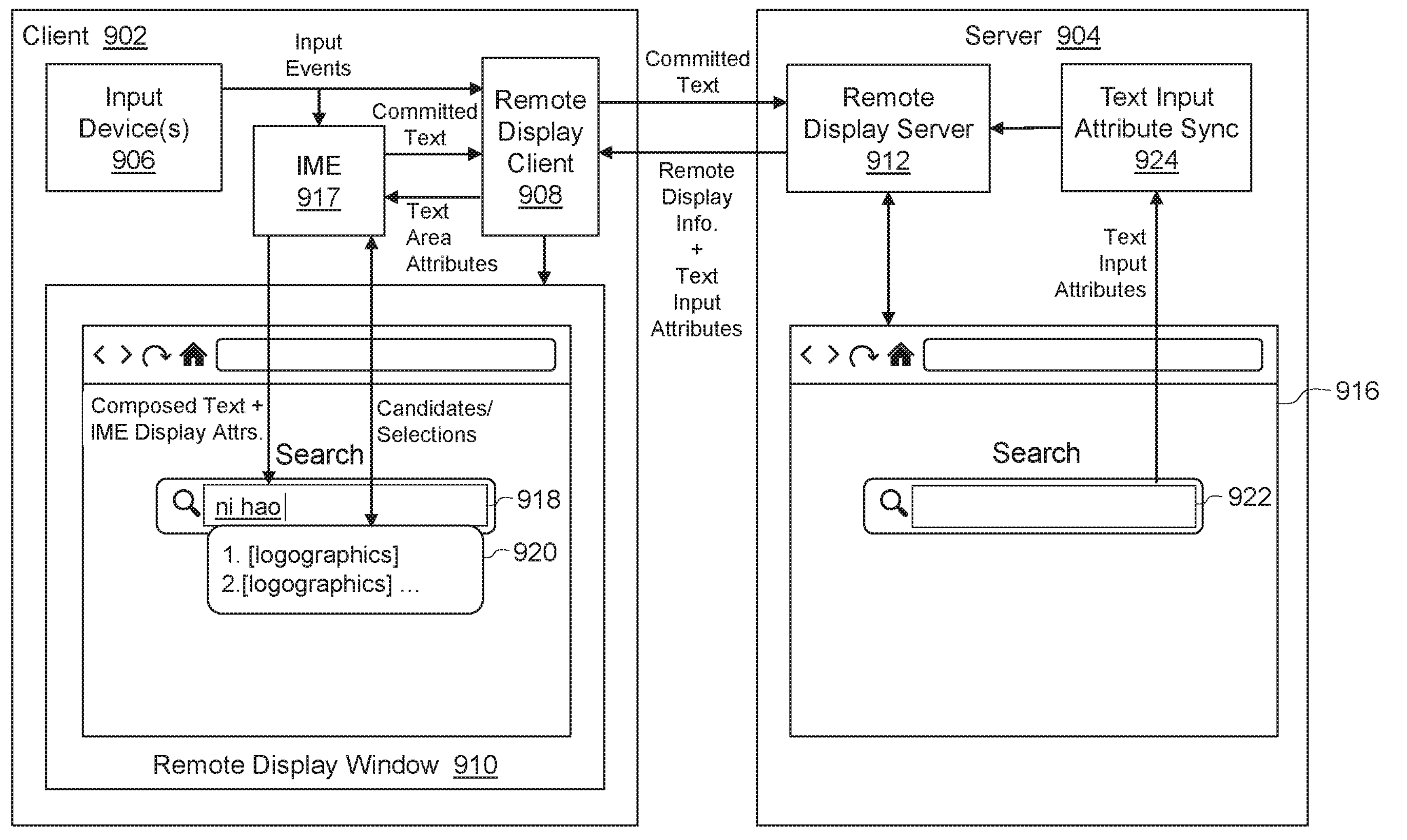
FIG. 9 is a diagram of a client-server environment having an improved IME for remote applications, according to embodiments of the present disclosure.

FIG. 9 shows a client-server environment having an improved IME for remote applications, according to embodiments of the present disclosure. The structures and techniques described herein can overcome various technical problems found in some IME implementations for remote applications, such as the technical problems discussed above in conjunction with the IME implementations of FIGS. 6-8.

An illustrative computing environment 900 includes a client 902 and a server 904 which may be connected via one or more computer networks (not shown) such as the Internet or another wide area network (WAN). In the example shown, client 902 accesses an application 916 running on server 904 using a remote display protocol. In general, server 904 may provide one or more clients with access to one or more remote applications. The remote display protocol can include a set of data transfer rules that allow for applications and desktops hosted on server 904 to be displayed on remote client 902 and to receive various types of inputs therefrom.

In some embodiments, client 902 and/or server 904 may include various hardware and/or software components similar to those described above in the context of device 103 of FIG. 1. In some embodiments, client 902 and server 904 may form a part of a remote-access system, such as the remote access-system of FIG. 2 described above. In some embodiments, server 904 can be a virtualization server such as virtualization server 301 of FIG. 3. For example, remote display server 912 may be provided as part of a virtual desktops/applications component of server 904. In some embodiments, client 902 and server 904 may be part of a cloud-based system, such as a cloud-based system described above in the context of FIG. 4. In some embodiments, server 904 and client 902 may run different OS's. For example, server 904 may run Linux and client 902 may run WINDOWS or MACOS.

Illustrative client 902 includes one or more input devices 906, a remote display client 908, a remote display window 910, and an IME 917, among other hardware and/or software components not shown to promote clarity in the drawing. Input devices 906 can include physical and/or virtual input devices (e.g., keyboards, mice, touchscreens, etc.) that generate input events responsive to a user. Such input events can include keystrokes, mouse clicks, touch events, etc. Client 902 can include device drivers (not shown) to handle input from corresponding ones of the input devices 906.

Remote display client 908 can include the functionality of a conventional remote display client as well as additional functionality described herein that enables an improved IME experience for accessing remote applications. Remote display client 908 may be implemented within a native application or as a browser-based client such as an HTML5 client. In the latter case, remote display window 910 may correspond to browser window and various functionality of the remote display client 908 may be implemented using JavaScript or another scripting language supported by the browser.

Client-side IME 917 can render, or cause to be rendered, both a composition window 918 and a candidates window 920. The user can compose text within composition window 918 and select alternative text within candidates window 920. Thus, client-side IME 917 provides users with a fully native IME experience and allows users to use their preferred IME.

Illustrative server 904 includes a remote display server 912, application 916, and a text input attribute synchronization module 924 (or "synchronization module" for short), among other hardware and/or software components not shown to promote clarity in the drawing. Remote display server 912 can include the functionality of a conventional remote display server as well as additional functionality described herein that enables an improved IME experience for remote application access.

As shown in FIG. 9, illustrative application 916 can be a web browser running remotely on server 904. In some embodiments, the remote web browser may be provided as a remote browser with enhanced security features such as the CITRIX SECURE BROWSER SERVICE. For example, the remote web browser may isolate web browsing to protect a corporate network from browser-based attacks. In some embodiments, the remote browser may be based on Chromium. The structures and techniques described herein are not limited to use with remote web browsers and can generally be used in conjunction with any type of remotely accessed application. Illustrative application 916 includes an active text input 922, which may correspond to an HTML <input> or <textarea> element, or other type of UI element/control that can receive keystrokes.

In operation, a user of client 902 can compose text using the client-side IME's composition window 918 and candidates window 920. When the user is finished composing text within the current composing string, the composed text can be finalized or "committed" by IME 917 and sent to server 904 by remote display client 908 using a remote display protocol. On the server 904, remote display server 912 receives the composed text and provides it to application 916 where it is inserted into the active text input 922 of application 916 (e.g., into a currently focused HTML input of a web page). In turn, the client-side remote display window 910 can be updated via the remote display protocol to display the committed text within the active text input 922 of remote application 916.

As previously discussed, with some IME implementations for remote application access, the client-side composition window may not match (in terms of visual appearance or functionality) that of the server-side active text input. This and other technical problems can be solved using the structures and techniques described herein.

Synchronization module 924 can collect or otherwise determine one or more attributes of active text input 922 and provide these text input attributes to client 902 via the remote display protocol as discussed in detail below. Following are non-limiting examples of text input attributes that can be determined by synchronization module 924.

- A type of the text input. In the case of an HTML input, the type may correspond to the element type and/or an associated "type" attribute. For example, <input type=text>, <input type=password>, and <textarea> may be treated as three different types of text inputs, as can any HTML element with the attribute "contenteditable=true."
- Dimensions of the text input, such as its height and width/length.
- A position of the text input relative to a window, viewport, or other display area in which application 916 is rendered. The position can be specified, for example, as offsets from edges of the application display area to edges of the text input.
- Padding within the text input, meaning an amount of blank space provided between one or more edges of the text input and text rendered inside the text input. In some embodiments, separate padding values can be determined for the top, right, bottom, and left edges of the text input.
- Font family, size, style, and other font attributes used by the text input.
- An "overflow" attribute that specifies how to handle when text within the text input is too big to fit within the text input area. In the case of an HTML input, the overflow attribute can be one of "visible," "hidden," "scroll," or "auto."
- A "word break" attribute that specifies whether line breaks should be used where the text would otherwise overflow the text input area. In the case of an HTML input the word break attribute can be one of "normal," "break-all," "keep-all," or "break-word."
- One or more attributes that specify the length and/or height of previously entered text within the text input. In some embodiments, the previously entered text itself may be collected as a text input attribute and the length/height of the previously entered text can be calculated from the text itself
- Other attributes that affect the presentation of the text input and/or characters entered there within.

Synchronization module 924 can monitor application 916 to detect when a text input receives focus and thus becomes the "active" text input of application 916 (i.e., the text input currently configured to receive keystrokes). As is known, an application many include many inputs and, in general, only a single input can have focus at a current time. In some embodiments, synchronization module 924 may use one or more event listeners to detect (or "listen for") a change in focus associated with application 916. In response to detecting that a text input receives focus (i.e., becomes the active text input for application 916), synchronization module 924 can collect one or more attributes of that text input. In the case where remote application 916 is a browser and active text input 922 is an HTML element within a web page, synchronization module 924 can collect the text input attributes by querying/inspecting the Document Object Model (DOM) and/or one or more Cascading Style Sheets (CSS) associated with the web page.

In some embodiments, synchronization module 924 can detect when one or more attributes of the active text input 922 change. In response, synchronization module 924 can collected the changed text input attributes and provide them to client 902 via the remote display protocol. For example, synchronization module 924 may detect that the dimensions of the active text input 922 changed when the user resizes a window of application 916. As another example, synchronization module 924 may detect when the font family or font size of active text input 922 changes. In some embodiments, synchronization module 924 may use event listeners to detect changes to attributes of active text input 922. In some embodiments, synchronization module 924 may periodically collect attributes of active text active text input 922 and compare newly collected attributes to previously collected attributes to determine if any of the attributes changed (i.e., it may use a polling technique to detect attribute changes).

Synchronization module 924 may also detect when the active text input 922 loses focus and, in response, may stop collecting attributes for that text input. Synchronization module 924 may then start collecting attributes of a different active text input, if one exists.

Input area synchronization module 924 may be provided as a module of application 916 or as a separate application/service on server 904. In the case where application 916 is a web browser, input area synchronization module 924 may be provided as a JavaScript module that is dynamically injected into a web page loaded by the browser. For example, application 916 may be a browser that is configured to inject JavaScript that implements the disclosed functionality of input area synchronization module 924 into some or all web pages loaded within the browser.

Synchronization module 924 may provide collected text input attributes to client 902 via the remote display protocol. In more detail, synchronization module 924 may send the text input attributes to remote display server 912 which. In turn, remote display server 912 may generate a remote display protocol message (e.g., an ICA or RDP message) that includes the text input attributes and send the message to remote display client 908 over one or more computer networks. Remote display client 808 and server 912 may implemented as a conventional remote display client and server, respective, but further configured to handle the synchronization of text input attributes as described herein. This synchronization process can be repeated when the attributes of the active text input change and/or when the active text input itself changes.

Turning to the client side, remote display client 908 can receive the text input attributes from server 904 via the remote display protocol. The received attributes can then be used to configure the client-side composition window 918 to match the active text input 922 of remote application 916 in terms of appearance and functionality. Client 902 can use the received text input attributes to render local composition window 918 with the same attributes (e.g., the same dimensions, position, font, etc.) as server-side active text input 922. In the example of FIG. 9, remote display client 908 can provide the text input attributes to client-side IME 917 which can directly render composition window 918 using those attributes, or can provide the attributes to an application running on client 902 that renders composition window 918 (e.g., via IMM or the Input Method Editor API). IME 917 may, directly or indirectly, configure candidates window 920 to match one or more attributes of composition window 918 and, thus, also match attributes of active text input 922. For example, IME 917 may set the font family, size, and style of candidates window 920 to match composition window 918. In some embodiments, candidates window 920 may be positioned relative to composition window 918 and, thus, positioning composition window 918 to match active text input 922 may automatically result in candidates window 920 being placed in an appropriate location relative to active text input 922 (i.e., in some embodiments IME 917 need not explicitly position candidates window 920 using the received text input attributes).

In some embodiments, the received attributes can include information described previously entered text within the active text input 922. This information can include, for example, the previously entered text itself or information specifying the length and/or height of previously of the previously entered text. IME 917 can use this information to adjust the position and/or dimensions of composition window 918 so that text composed within composition window 918 does not overlay and interfere with the previous entered text of active text input 922.

In some embodiments, the received text input attributes can specify the type of the active text input and IME 917 can use the received type information to selectively enable or disable IME composition for the current active text input. For example, if the active text input is a password input, IME 917 can disable composition window 918 and candidates window 920 when the password input has focus.

Of note, within the illustrative remote display window 910 of FIG. 9, only composition window 918 and candidates window 920 are rendered locally on client 902; the remaining visual elements shown within remote display window 910 are rendered on server 904 and displayed on client 902 by way of the remote display protocol.

Figure 9A:
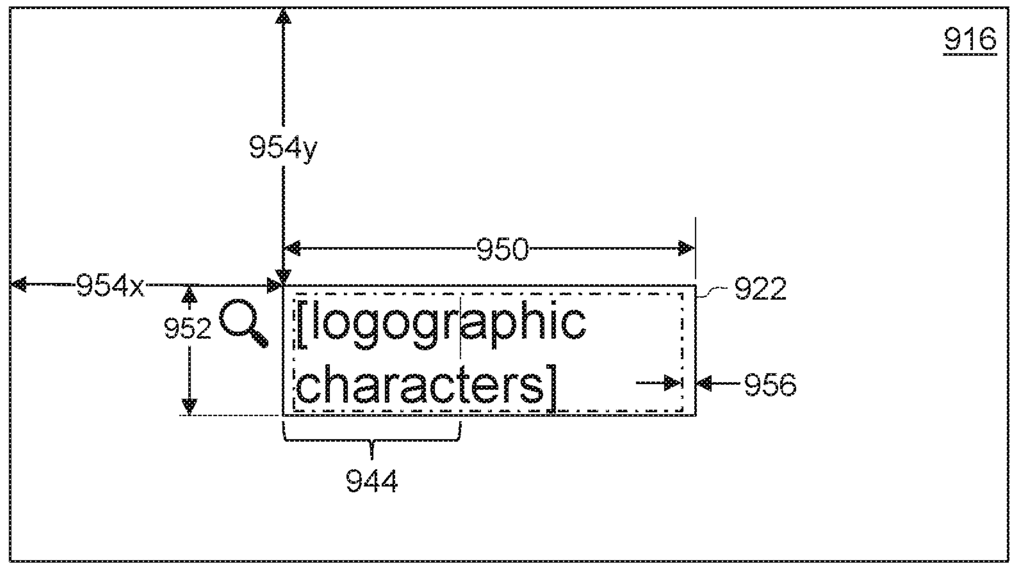
FIG. 9A is a diagram illustrating techniques for configuring a client-side composition window to match a server-side text input, according to embodiments of the present disclosure.
Figure 9A:
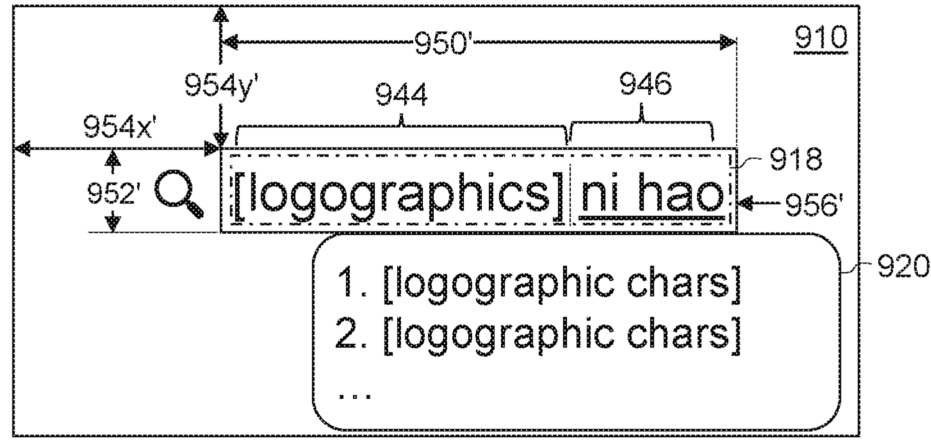

FIG. 9A illustrates how the client-side composition window 920 can be configured to match the server-side active text input 922 by synchronizing text input attributes, according to embodiments of the present disclosure. In this simplified example, active text input 922 may be of type <input type=text> and may have the following additional attributes: width 950, height 952, position **954*x*, 954*y*, and padding 956. As shown, the active text input's position can be defined by (1) a horizontal offset 954*x* from a left edge of the application's 916 display area to a left edge of active text input 922 and (2) a vertical offset 954*y* from a top edge of the application's 916 display area to a top edge of active text input 922. In this example, padding 956 is the same at all four edges of active text input 922, however in general different padding values may be collected for the top, right, bottom, and left edges of an active text input. Active text input 922 can include previously entered text 944 and information describing the previously entered text 944** can be collected as another text input attribute.

The attributes of active text input 922 can be collected by a synchronization module running on the server, such as synchronization module 924 of FIG. 9, and sent to the client where they are used to configure the IME composition window 918. For example, as shown, the composition window 918 may be configured to have width 950', height 952', and padding 956' equal to, or approximately equal to, the width 950, height 952, and padding 956 of server-side text input 922. As shown, client-side remote display window 910 and application 916 can have different sized display areas (e.g., different window dimensions). Thus, in some cases the server-side active text input position **954*x*, 954*y* may be translated into a client-side position 954*x*', 954*y*' which can be applied to the composition window 918 to give the appearance that the composition window 918 and active text input 922** have the same position with respect to the remote application.

Also using the text input attributes, client can determine the length of previously entered text 944 and configure composition window 918 such that subsequently composed text 946 does not overlay the previously entered text 944. For example, as shown in FIG. 9A, composed text 946 may be offset to the right of previously entered text 944. This can be accomplished in different ways, such as increasing a left-side margin of composition window 918, adjusting the horizontal offset **954*x*' of composition window 918, etc. The length and/or height of the previously entered text 944 can be calculated by the server and provided to the client as a text input attribute, or the previously entered text 944** itself can be provided as a text attribute and used by the client to calculate the length/height.

As illustrated in FIG. 9A, using the structures and techniques disclosed herein, the client-side IME composition window 918 can be restricted to the dimensions of the active text input 922 and configured to visually match the active text input 922, providing an improved IME experience for remote applications.

Figure 9B:
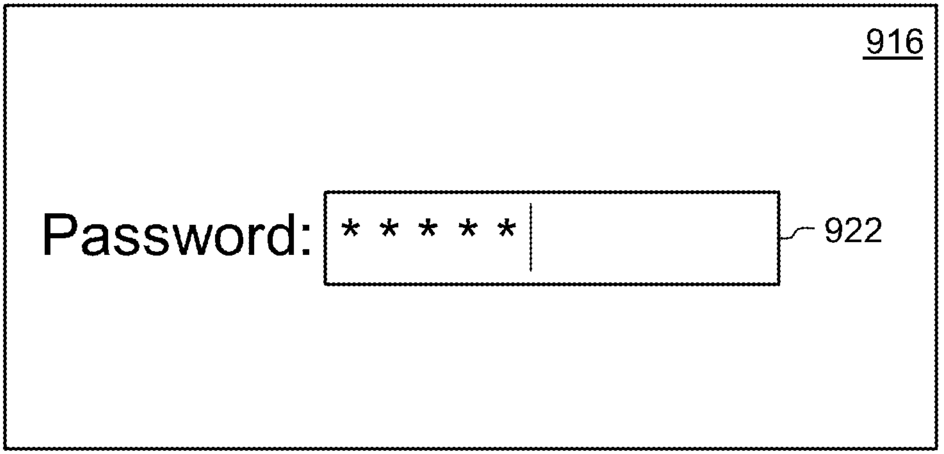
FIG. 9B is a diagram illustrating a technique for disabling a client-side IME for server-side inputs that accept sensitive information, according to embodiments of the present disclosure.

FIG. 9B illustrates how the IME of FIG. 9 can be disabled for inputs that accept sensitive information, such as password inputs, according to embodiments of the present disclosure. In this example, server-side active text input 922 may be of type <input type=password>. This text input attribute can be sent to the client where the client-side IME (e.g., IME 917 of FIG. 9) can use it to determine that the composition window and candidates window should not be enabled for active text input 922. As a result, the user's password is hidden from view not only within remote application 916 but also within the client-side remote display window 910.

Figure 10:
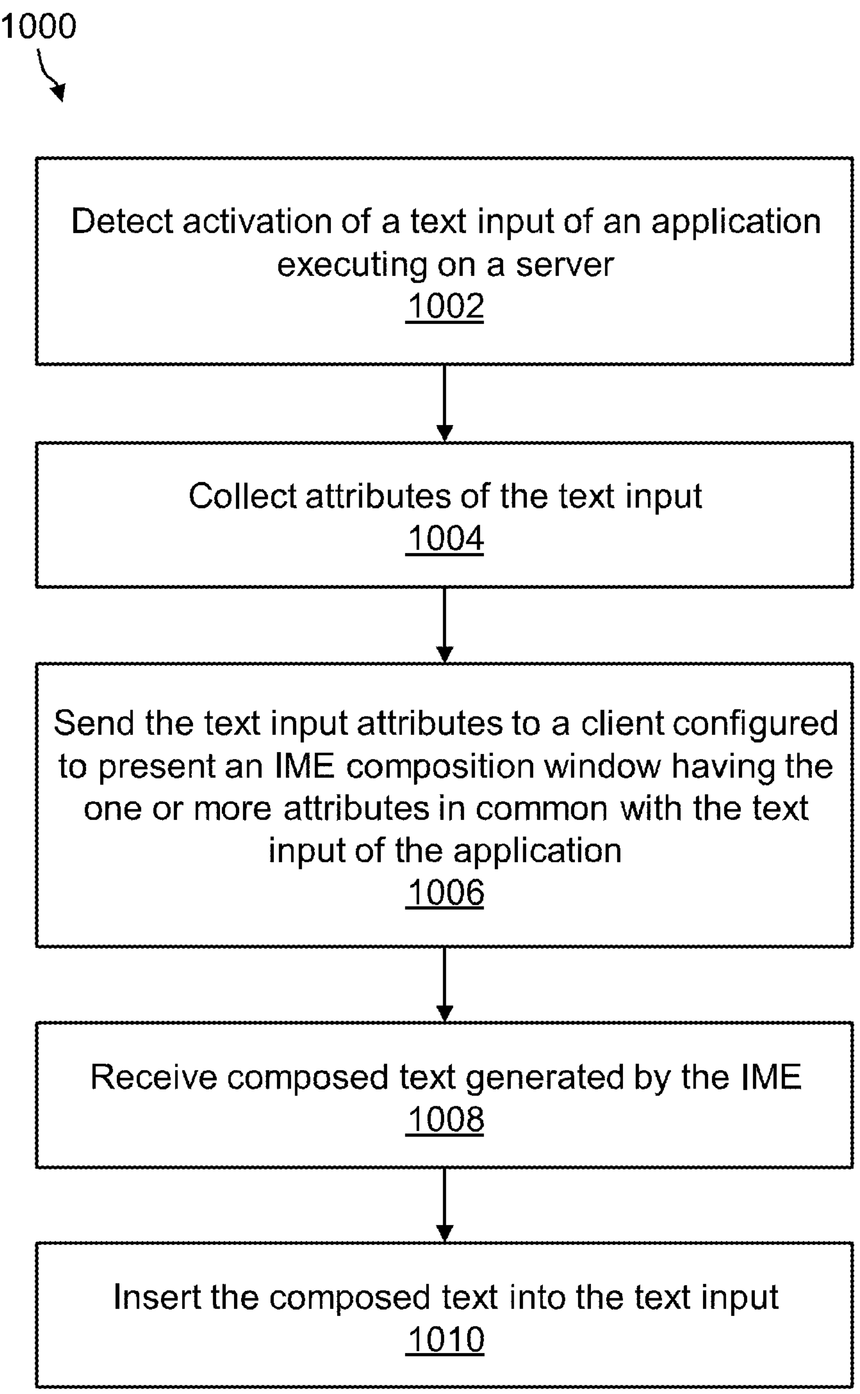
FIGS. 10 and 11 are flow diagrams of illustrative processes that can be utilized within the client-server environment of FIG. 9, according to embodiments of the present disclosure.
Figure 11:
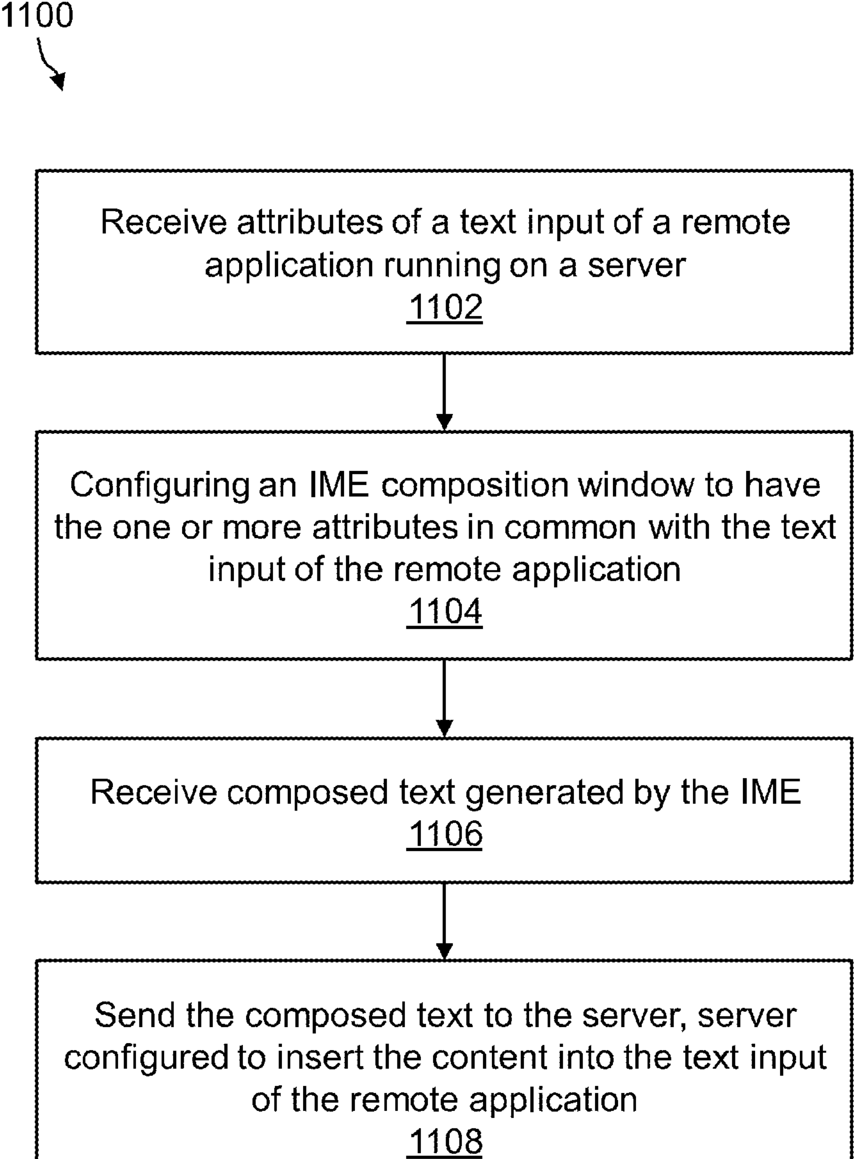

FIGS. 10 and 11 are flow diagrams of illustrative processes that utilized, for example, within the client-server environment of FIG. 9. In more detail, the process of FIG. 10 may be performed by a one or more components of a server, such as server 904 of FIG. 9, and the process of FIG. 11 may be performed by a one or more components of a client, such as client 902 of FIG. 9. In the following description, it is assumed that the client is accessing a remote application running on the server.

Referring to FIG. 10, an illustrative server-side process 1000 can begin at step 1002 wherein activation of a text input of the application is detected. In some embodiments, a synchronization module running on the server may listen or otherwise detect that a text input of the application gains focus or otherwise configured to receive keystrokes.

At block 1004, one or more attributes of the text input are collected. The collected text input attributes can include, for example, and a type of the text input, dimensions of the text input, a position of the text input, font attributes of the text input, and/or information describing text entered within the text input. Any of the previously described techniques for collecting text input attributes from a server application can be used.

At block 1006, the text input attributes can be sent to the client (e.g., via a remote display protocol). The client can use the text input attributes to present an IME composition window having the one or more attributes in common with the text input of the remote application. In some embodiments, the client can also configure an IME candidates window using the one or more text input attributes. Any of the previously described techniques for configuring the IME composition window and/or candidates window to match the active text input can be used. In some embodiments, the server can detect changes to the active text input and/or its attributes and send updated attribute information to the client in response.

At block 1008, the server can receive composed text generated by the client-side IME (e.g., in response to keystrokes received by the IME composition window and/or selections made within the IME candidates window). At block 1010, the server can insert the composed text into the active text input.

Referring to FIG. 11, an illustrative client-side process 1100 can begin at step 1102 wherein one or more attributes of a text input of the remote application are received. For example, the text input attributes may be sent from the server to the client via a remote display protocol.

At block 1104, the client can use the received text input attributes to configure a local IME composition to have the one or more attributes in common with the remote application's text input. In some embodiments, the client can also configure an IME candidates window using the received text input attributes. Any of the previously described techniques for configuring the IME composition window and/or candidates window to match the active text input can be used.

At block 1106, the client can receive composed text generated by the IME, e.g., in response to keystrokes received by the IME composition window and/or selections made within the IME candidates window. At block 1108, the client can send the composed text to the server and, in turn, the server may insert the composed text into the text input of the remote application.

The following examples pertain to further embodiments, from which numerous permutations and configurations will be apparent.

Example 1 includes a method including: detecting, by a first computing device, activation of a text input of an application executing on the first computing device; and responsive to the detection of the activation of the text input, sending one or more attributes of the text input from the first computing device to a second computing device displaying the application, the second computing device configured to present a composition window having the one or more attributes in common with the text input of the application, the composition window being part of an input method editor (IME) executing on the second computing device.

Example 2 includes the subject matter of Example 1 and further including: receiving, by the first computing device, composed text generated by the IME executing on the second computing device, the composed text based at least in part on keystrokes received by the composition window; and inserting, by the first computing device, the composed text into the text input of the application.

Example 3 includes the subject matter of Example 1, wherein the one or more attributes of the text input include dimensions and a position of the text input.

Example 4 includes the subject matter of Example 1, wherein the one or more attributes of the text input include a font family and a font size of the text input.

Example 5 includes the subject matter of Example 1, wherein the one or more attributes of the text input include information describing text entered within the text input, the second computing device configured to adjust the composition window based on a length of the text entered within the text input.

Example 6 includes the subject matter of Example 1, wherein the one or more attributes of the text input include a type of the text input, wherein the second computing device configure is configured to selectively enable the IME based on the type of the text input.

Example 7 includes the subject matter of Example 1, wherein sending the one or more attributes of the text input from the first computing device to the second computing device includes sending the one or more attributes of the text input via a remote display protocol.

Example 8 includes the subject matter of Example 1 and further includes: detecting, by the first computing device, a change to at least one of the one or more attributes of the text input; and responsive to the detection of the change, sending the at least one changed attribute to the second computing device, the second computing device configured to adjust the composition window to have the at least one changed attribute in common with the text input of the application.

Example 9 includes the subject matter of Example 1, wherein the application is a web application and the text input is an HTML element of the web application.

Example 10 includes the subject matter of Example 1, wherein the detection of the activation of the text input includes detecting a focus of the text input.

Example 11 includes the subject matter of Example 1, wherein the application is executing within a virtual machine (VM) on the first computing device.

Example 12 includes a method including: receiving, by a first computing device, one or more attributes of a text input of an application executing on a second computing device, the first computing device displaying the application; and configuring, by the first computing device, a composition window to have the one or more attributes in common with the text input of the application, the composition window being part of an input method editor (IME) executing on the first computing device.

Example 13 includes the subject matter of Example 12 and further including: receiving, by the first computing device, composed text generated by the IME based at least in part on keystrokes received by the composition window; and sending, by the first computing device, the composed text to the second computing device, the second computing device configured to insert the composed text into the text input of the application.

Example 14 includes the subject matter of Example 12, wherein the one or more attributes of the text input include dimensions and a position of the text input.

Example 15 includes the subject matter of Example 14, wherein the one or more attributes of the text input further include a font family and a font size of the text input.

Example 16 includes the subject matter of Example 12, wherein the one or more attributes of the text input include information describing text entered within the text input, wherein the configuring of the composition window includes adjusting the composition window based on a length of the text entered within the text input.

Example 17 includes the subject matter of Example 12, wherein the one or more attributes of the text input include a type of the text input, the method further including selectively enabling the IME based on the type of the text input.

Example 18 includes the subject matter of Example 12, wherein receiving the one or more attributes of the text input includes receiving the one or more attributes of the text input from the second computing device via a remote display protocol.

Example 19 includes the subject matter of Example 12, wherein the application is executing within a virtual machine (VM) on the second computing device.

Example 12 includes a computing device comprising: a processor; and a non-volatile memory storing computer program code that when executed on the processor causes the processor to execute a process comprising: detecting activation of a text input of an application executing on the computing device; and responsive to the detection of the activation of the text input, sending one or more attributes of the text input from the computing device to another computing device displaying the application, the another computing device configured to present a composition window having the one or more attributes in common with the text input of the application, the composition window being part of an input method editor (IME) executing on the another computing device.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:

executing, by a first computing device, a remote application that provides a user interface to be displayed on a display of a second computing device;

detecting, by a synchronization module executing on the first computing device, activation of a text input of the user interface on the first computing device; and responsive to the detection of the activation of the text input, receiving, by the synchronization module, via a display protocol, one or more attributes of the text input;

sending one or more attributes of the text input from the first computing device to the second computing device displaying the user interface;

displaying, by the second computing device, a composition window within the user interface, the composition window including text displayed in accordance with the one or more attributes sent by the second computing device, wherein the composition window is part of an input method editor (IME) executing on the second computing device;

determining, by the second computing device, based on the one or more attributes, whether the text input comprises sensitive information, wherein the one or more attributes of the text input include dimensions and a position of the text input;

disabling, by the second computing device, the IME if the text input comprises sensitive information so that the sensitive information is not displayed in the user interface; and receiving, by the first computing device, composed text generated by the IME executing on the second computing device, the composed text based at least in part on keystrokes received by the composition window; and inserting, by the first computing device, the composed text into the text input of the application.

2. The method of claim 1, wherein the one or more attributes of the text input include a font family and a font size of the text input.

3. The method of claim 1, wherein the one or more attributes of the text input include information describing text entered within the text input, the second computing device configured to adjust the composition window based on a length of the text entered within the text input.

4. The method of claim 1, wherein sending the one or more attributes of the text input from the first computing device to the second computing device includes sending the one or more attributes of the text input via a remote display protocol.

5. The method of claim 1, further comprising:

detecting, by the first computing device, a change to at least one of the one or more attributes of the text input;

and responsive to the detection of the change, sending the at least one changed attribute to the second computing device, the second computing device configured to adjust the composition window to have the at least one changed attribute in common with the text input of the application.

6. The method of claim 1, wherein the application is a web application and the text input is an HTML element of the web application.

7. The method of claim 1, wherein the detection of the activation of the text input includes detecting a focus of the text input.

8. The method of claim 1, wherein the application is executing within a virtual machine (VM) on the first computing device.

9. A method comprising:

receiving, by a first computing device, one or more attributes of a text input of an application executing on a second computing device, the first computing device displaying a user interface of the application;

detecting, by a synchronization module executing on the second computing device, activation of a text input of the user interface on the first computing device;

sending, by the second computing device, one or more attributes of the text input to the first computing device;

configuring, by the first computing device, a composition window to have the one or more attributes in common with the text input of the application, wherein the composition window is part of an input method editor (IME) executing on the first computing device;

determining, by the second computing device, based on the one or more attributes. whether the text input comprises sensitive information, wherein the one or more attributes of the text input include dimensions and a position of the text input;

disabling the IME if the text input comprises sensitive information so that the sensitive information is not displayed in the user interface; and receiving, by the first computing device, composed text generated by the IME based at least in part on keystrokes received by the composition window; and sending, by the first computing device, the composed text to the second computing device, the second computing device configured to insert the composed text into the text input of the application.

10. The method of claim 9, wherein the one or more attributes of the text input further include a font family and a font size of the text input.

11. The method of claim 9, wherein the one or more attributes of the text input include information describing text entered within the text input, wherein the configuring of the composition window includes adjusting the composition window based on a length of the text entered within the text input.

12. The method of claim 9, wherein receiving the one or more attributes of the text input includes receiving the one or more attributes of the text input from the second computing device via a remote display protocol.

13. The method of claim 9, wherein the application is executing within a virtual machine (VM) on the second computing device.

14. A computing device comprising:

a processor; and a non-volatile memory storing computer program code that when executed on the processor causes the processor to execute a process comprising:

detecting activation of a text input of an application executing on the computing device; and responsive to the detection of the activation of the text input, sending one or more attributes of the text input from the computing device to second computing device displaying a user interface of the application;

displaying, by the second computing device a composition window including text displayed in accordance with the one or more attributes, wherein the composition window is part of an input method editor (IME) executing on the second computing device;

determining, by the second computing device, based on the one or more attributes, whether the text input comprises sensitive information, wherein the one or more attributes of the text input include dimensions and a position of the text input;

disabling the IME if the text input comprises sensitive information so that the sensitive information is not displayed in the user interface; and receiving, by the first computing device, composed text generated by the IME based at least in part on keystrokes received by the composition window; and sending, by the first computing device, the composed text to the second computing device, the second computing device configured to insert the composed text into the text input of the application.

* * * * *